United States Patent [19]
Lorber

[11] 3,842,418
[45] Oct. 15, 1974

[54] RADAR CROSS-SECTION MEASUREMENT APPARATUS

[76] Inventor: Herbert W. Lorber, 14755 Penasquitos Ct., San Diego, Calif. 92129

[22] Filed: Feb. 8, 1973

[21] Appl. No.: 330,578

[52] U.S. Cl. ........................... 343/5 SA, 343/17.5
[51] Int. Cl. ............................................ G01s 9/02
[58] Field of Search ........................ 343/5 SA, 17.5

[56] References Cited
UNITED STATES PATENTS

| | | | |
|---|---|---|---|
| 2,965,896 | 12/1960 | Wright et al. | 343/17.5 |
| 3,045,233 | 7/1962 | Katz et al. | 343/17.5 X |
| 3,168,735 | 2/1965 | Cartwright | 343/17.5 X |
| 3,197,773 | 7/1965 | Black et al. | 343/17.5 X |
| 3,680,085 | 7/1972 | Signore | 343/17.5 X |
| 3,719,945 | 3/1973 | Sletten et al. | 343/5 SA |
| 3,719,946 | 3/1973 | Sletten et al. | 343/5 SA |

Primary Examiner—Malcolm F. Hubler
Attorney, Agent, or Firm—Richard K. Macneill

[57] ABSTRACT

A radar cross-section measurement apparatus for measuring reflections from a designated target while rejecting spurious reflections and direct coupling from the transmitter in which first and second frequency or phase related continuous wave signals are fed into a hybrid junction with an output coupled to a phase comparison means such as a phase detector or a first detector of a receiver for cancelling undesired phase signals as seen by a narrow band receiver and allowing only the desired signal received by the target to pass into the receiver.

4 Claims, 3 Drawing Figures

3,842,418

RADAR CROSS-SECTION MEASUREMENT APPARATUS

BACKGROUND OF THE INVENTION

This invention relates to a radar cross-section measurement, and more particularly relates to a method and apparatus for eliminating background reflection or direct transmission from the transmitter to the receiver of a continuous-wave radar without impairing its sensitivity to reflections from a target under study at a fixed distance.

Continuous-wave radars are chosen for use in both outdoor and indoor laboratory configurations for measuring radar cross-sections, where limited space and inexpensive electronic equipment are the governing considerations in the choice between pulsed and continuous-wave radars for measuring radar cross-sections. Pulsed radars are inherently capable of discriminating between the desired reflections that come from the target under study at a fixed distance, and the undesired reflections that come from structures at other distances. Pulsed radars are also inherently capable of discriminating against the inevitable undesired direct transmission from the transmitter to the receiver, commonly known as the "main bang." However, pulsed radars are inherently much more complicated and expensive than continuous-wave radars, especially when designed to operate in small indoor laboratory chambers. On the other hand, continuous-wave radars are notoriously difficult to adjust for adequate discrimination between desired and undesired reflections and transmissions. Moreover, once adjusted, they usually fail to maintain satisfactory adjustment for more than a few minutes. Accordingly, it is the object of this invention to provide means for continuous-wave radars to discriminate reliably between desired and undesired reflections and transmissions without sacrificing their advantages of simplicity and short-range capability when compared with pulsed radars.

Many of the advantages of this invention will be readily appreciated as it becomes better understood by reference to the following detailed description when considered in connection with the accompanying drawings, wherein.

DETAILED DESCRIPTION OF THE DRAWINGS

Figure 1:
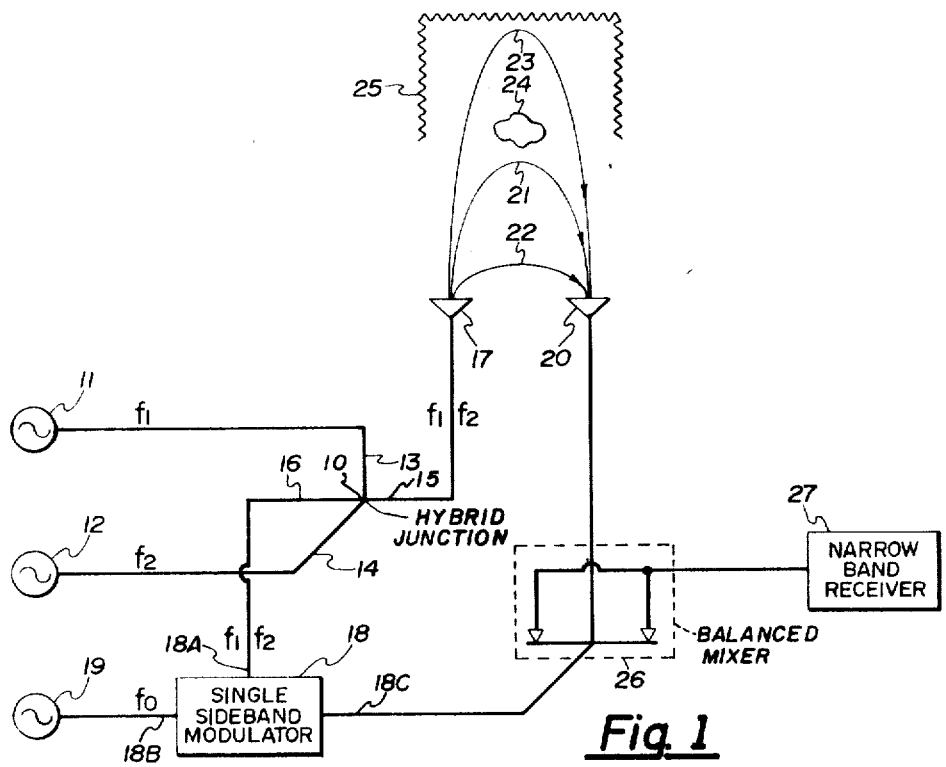
FIG. 1 is a schematic block diagram of a simplified embodiment of the invention.

With reference now to FIG. 1, a schematic block diagram of a simplified embodiment of the invention is shown, having an unmodulated continuous wave oscillator or signal source 11, operating at a radar frequency $f_1 = f - F$, and a second such source 12, operating at a radar frequency $f_2 = f + F$, where the difference frequency $2F$ is determined in accordance with criteria to be described later. The sources 11 and 12 are connected to the two isolated ports 13 and 14 of a hybrid junction 10. The power into port 13 is adjusted to be equal to that into port 14. Then, the wave form emerging from the port 15 of the hybrid junction is, apart from a multiplicative constant, $\cos[2\pi(f+F)t] + \cos[2\pi(f-F)t] = 2\cos(2\pi Ft)\cos(2\pi ft)$, where $t$ is the time measured from an appropriately chosen origin. The wave form emerging from the remaining port 16 is then, to within an algebraic sign, $\cos[2\pi(f+F)t] - \cos[2\pi(f-F)t] = 2\sin(2\pi Ft)\sin(2\pi ft)$. The power output from port 16 is fed into port 18A of a single-sideband modulator 18. Another input port 18B is fed by an unmodulated continuous-wave intermediate frequency source 19 of frequency $f_0$, which in practice is lower than $F$. Output 18C of the single-sideband modulator 18 is, except for a multiplicative constant, the wave form $\sin(2\pi Ft)\sin[2\pi(f+f_0)t + \phi]$ where $\phi$ is an arbitrary phase shift. A fraction of the power emitted by transmitting antenna 17 finds its way to receiving antenna 20 by way of paths 21, 22 and 23, by reflection from the target 24, by direct feed-through between the antennas, and by reflection from surrounding structure 25. Power from the receiving antenna 20 and from the singlesideband modulator 18 is combined in a conventional radar receiver first detector, shown in this embodiment as a balanced mixer 26. The wave form from the receiving antenna 20 consists of the sum of three wave forms, given, except for a multiplicative constant, by the expressions $\cos[2\pi F(t - t_a)]\cos[2\pi f(t - t_a)]$, $\cos[2\pi F(t - t_{tgt})]\cos[2\pi f(t - t_{tgt})]$ and $\cos[2\pi F(t - t_{bg})]\cos[2\pi f(t - t_{bg})]$ where $t_a$ is the time delay along path 22 directly between antennas, $t_{tgt}$ is the time delay along path 21 between antennas by way of the target 24, and $t_{bg}$ is the time delay along path 23 between antennas by way of the background structure 25. The frequency $F$ and the distance from the antennas 17 and 20 to the target 24 and to the background structure 25 are chosen such that $2\pi F(t_{tgt} - t) = m\pi/2$ and $2\pi F(t_{bg} - t_a) = n\pi/2$ where $m$ is an odd integer, typically 1, and $n$ is an even integer typically 2. Thus, when the wave form from the single-sideband modulator 18 mixes in the receiver first detector 26 with the composite wave form from the receiving antenna 20, the two undesired components of the received wave form are in phase quadrature with the wave form from the single-sideband modulator 18, at the modulation frequency $F$. The desired component of the received wave form is in phase with the wave form from the single-sideband modulator 18, at the modulation frequency $F$. Therefore, in the output wave form from the first detector 26, the only component near the frequency $f_0$ free of modulation at the frequency $F$ is directly proportional to the desired component of the received wave form. Accordingly, the output of the first detector is fed to a narrow band receiver 27 which is tuned to the frequency $f_0$ and which has a pass band just wide enough to accommodate variations in the radar cross section of the target. In other words, only the desired component of the received wave form appears at the frequency $f_0$; the undesired components appear only at the frequencies $f_0 + F$ and $|f_0 - F|$. Thus, the narrow band receiver 27 rejects the undesired direct feed-through and background reflection components of the received wave form while retaining full sensitivity to the component reflected by the target.

One way to verify that only the desired wave form appears in the output of the first detector 26 at the frequency $f_0$ is to take the product of $\cos(2\pi Ft + \Phi)\cos(2\pi ft + \phi)$, representing a component of the received wave form, and $\sin(2\pi Ft)\sin[2\pi(f+f_0)t]$, representing the wave form from the single-sideband modulator 18. It is easy to show, by means of the trigonometric identity $\sin(A + B) + \sin(A - B) = 2\sin A \cos B$, that the only component of the product of the two wave forms that is free of modulation at the frequency $F$, and does not appear near the radar frequency $f$ or its harmonics, is $-4 \sin \Phi \sin (2\pi f_0 t - -\phi)$. Thus, the demodulated response of the narrow band receiver 27 tuned to $f_0$ is independent of the phase of the wave forms at the radar frequency $f$, provided $f_0$ is non-zero, and depends only on the relative phase $\Phi$ of the modulation envelopes. Proper operation of the invention is based on making $\Phi$ an odd multiple of $\pi/2$ for the desired components of the received wave form and an even multiple of $\pi/2$ for the undesired components.

There are a few considerations implicit in the above description which perhaps should be emphasized, since they strongly affect the performance and the design of the invention. These are the following:

The rejection of undesired components of the received wave form depends on the modulation envelopes, at the frequency $F$, of the output wave form from the single-sideband modulator 18 and of the undesired components of the received wave form arriving at the first detector 26 in phase quadrature. In practice, therefore, it is advantageous to insert a device in the wave guide between the single-sideband modulator 18 and the first detector 26 to shift the phase of the component of the modulator output at the frequency $f + f_0 + F$ relative to that of the component at the frequency $f + f_0 - F$. Such a device might be a variable-length coaxial transmission line or a variable-width hollow wave guide near cutoff.

The output wave form of the single-sideband modulator 18 could just as easily have been $\sin (2\pi F t) \sin [2\pi(f - f_0)t + \phi] = 1/2 \cos [2\pi(f - f_0 - F)t + \phi] - 1/2 \cos [2\pi(f - f_0 + F)t + \phi]$. The wave form emerging from the output port of the first detector 26, into the narrow band receiver 27 would be the same in either case. Moreover, the need for the differential phase shifter mentioned in the previous paragraph would be the same in either case. Similarly, the frequency of source 11 could be $f - F$ and that of source 12 could be $f_2 = f + F$. The choice is immaterial.

If the transmitting and receiving antennas 17 and 20 are close together compared to the distance from them to the target 24 and the background structure 25, the conditions for approximate phase quadrature between desired and undesired components of the received wave form are met if the system is designed and operated such that $R_{tgt} = mc/(8F)$ and $R_{bg} = nc/(4F)$ where $c$ is the speed of light, $R_{tgt}$ is the distance from the antennas 17 and 20 to the target and $R_{bg}$ is the effective distance from the antennas to the background structure, and where $m$ is an odd integer and $n$ is an arbitrary integer. In a typical arrangement $m = n = 1$.

Since in usual practice the undesired components of the received wave form must be suppressed approximately 90 to 130 decibels with respect to the desired component, the phase quadrature suppression technique used in the invention is not likely to be sufficient to do the job alone. However, when used together with other suppression techniques already in common use, the invention can easily provide an additional twenty to forty extra decibels of suppression. This extra suppression may be used to improve the sensitivity of the system to targets of low radar cross-section, or to improve the operating reliability of the system to fluctuations of frequency and system geometry.

As with all electronic systems, operation of the invention differs slightly in practice from the ideal described above. In particular, the output of the single-sideband modulator 18 contains spurious components and the frequencies of the signal sources 11 and 12 drift with passing time.

The purpose of the single sideband modulator 18 is to provide a strong wave form to the first detector 26 having a modulation component at the frequency $F$ in closely maintained phase quadrature with the undesired components of the received wave form but having negligible sensitivity to the phases of the components of the received wave form at the frequency $f$. If a double-sideband modulator were used instead of a single-sideband modulator, this condition of negligible sensitivity would be lost. In practice, with a single-sideband modulator the second sideband is present to a slight extent. There is, therefore, a slight sensitivity to the phase of the $f$-frequency components of the received wave form, but this source of error would not jeopardize accuracy of the system on the order of $\pm 1$dB.

A practical microwave single-sideband modulator not only permits a small amount of the second sideband to appear in its output but also a small amount of power at the input microwave frequency. In the case of the single-sideband modulator 18, this spurious component has no effect on the wave form component at the input to the receiver at the frequency $f_0$, for most values of $f_0$.

If the two signal sources 11 and 12 drift in frequency with respect to each other, the drift in the half-difference frequency $F$ can become intolerably large. Drifts in $F$ can cause the phase quadrature condition between the modulation envelopes of the undesired components of the received wave form and the modulation envelope of the output of the single-sideband modulator 18 to suffer.

There are two ways to stabilize the frequencies of the two sources. One is to lock each source to its own stable reference. Such a reference is typically a harmonic of the output of a temperature-controlled crystal oscillator. The alternative is to derive the difference frequency $2F$ from its own stable reference. One way to do this is to drive a balanced mixer from sources at the frequencies $f$ and $F$. Ideally, the output of the balanced mixer consists of two frequency components: one at $f - F$ and one at $F + F$. In practice, however, a third weak, but quite noticeable, component is emitted at the frequency $f$. This third component should be eliminated completely for proper operation of the system. The most practical way to do this is to operate one signal source at one of the two frequencies $f + F$ or $f - F$, and use phase locking to hold the difference frequency, derived from a mixer fed by the two sources, equal to that of a third source operating at the frequency $2F$. This arrangement has the advantage of extreme frequency stability, together with complete freedom from spurious emissions.

Although the invention can operate with some spurious emissions present, the advantages of trouble-free stable operation are compromised.

Figure 2:
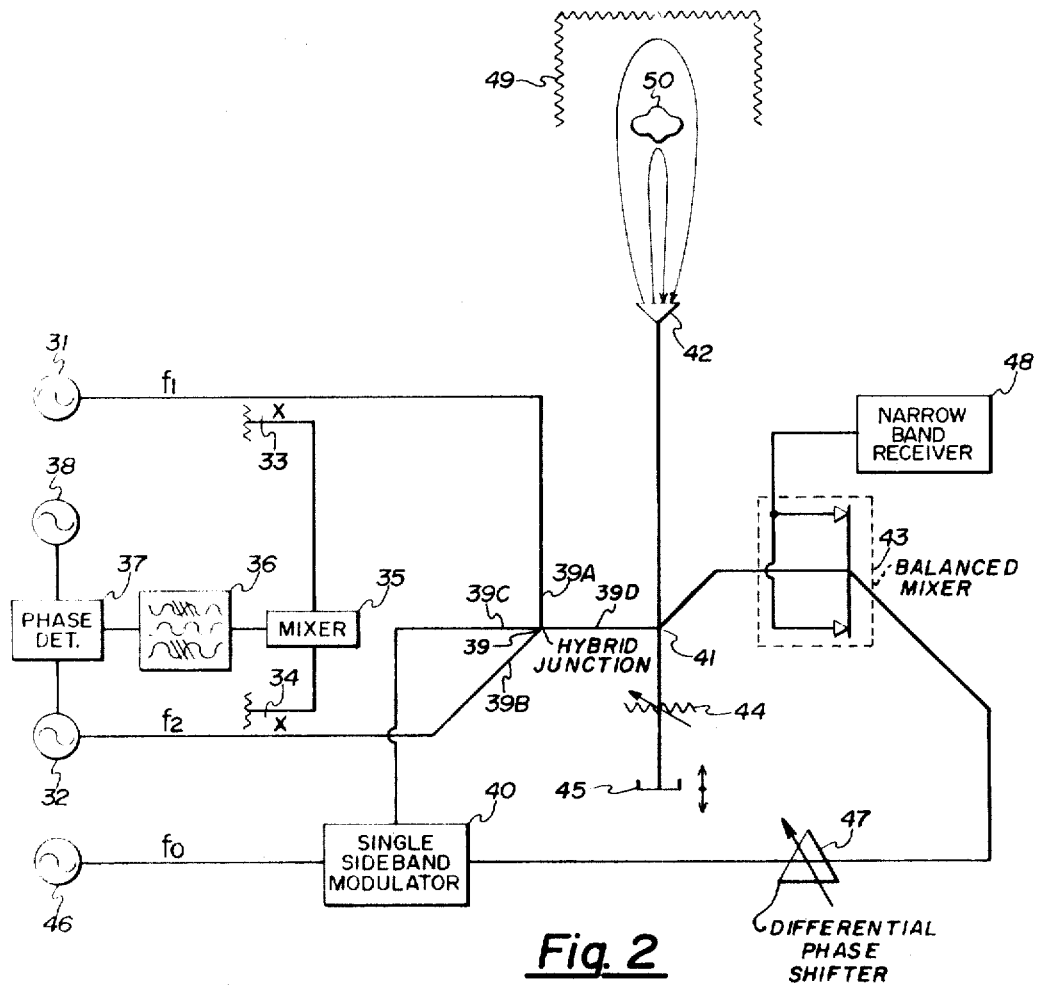
FIG. 2 is a schematic block diagram of an alternative practical embodiment of the invention.

The practical considerations discussed above are taken into account in the embodiment of the invention shown in FIG. 2. With reference now to FIG. 2, a schematic block diagram of a practical embodiment of the invention is shown having an unmodulated continuous-wave signal source 31, stabilized at a frequency $f_1 = f$ $\pm F$ by a phase-locked loop controlled by a temperature-stabilized crystal oscillator, and a second unmodulated voltagetunable continuous-wave source 32, stabilized at a frequency $f_2 = f \pm F$ by means of a second phase-locked loop. This second loop operates as follows: The outputs of sources 31 and 32 are sampled by the directional couplers 33 and 34, respectively, and fed to the mixer 35, where the difference frequency is taken by the band pass filter 36 and fed to the phase detector 37. The phase detector 37 is also fed by the unmodulated continuous-wave source 38 which is tuned to the difference frequency $2F$. The output voltage of the phase detector 37 is used to control the frequency of the voltagetunable source 32. The outputs of sources 31 and 32 are fed into the two isolated ports 39A and 39B, respectively, of the hybrid junction 39. The outputs 39C and 39D from the two remaining ports are fed to the single-sideband modulator 40 and the antenna hybrid junction 41. In this embodiment, a single antenna 42 is used for transmitting and receiving, and cancellation of undesired components in the wave form fed to the receiver first detector 43 is provided to a very great extent by proper adjustment of variable attenuator 44 and sliding short circuit termination 45. Additional discrimination against undesired components in the wave form fed to the first detector 43 from the antenna hybrid 41 is provided by the quadrature modulated output from the single-sideband modulator 40. The single-sideband modulator 40 is driven, not only by one of the two outputs from the hybrid junction 39, but also by an unmodulated continuous-wave source 46 at the frequency $f_0$. The output of the single-sideband modulator 40 is fed through differential phase shifter 47 to the receiver first detector 43. The output of the first detector 43 is amplified and detected by the narrow band receiver 48 which is tuned to the frequency $f_0$, and which rejects the frequencies $|f_0 \pm F|$.

The system is adjusted for proper operation with background structure 49 in place but with the target 50 removed. After the sources 38 and 46 have been set to their proper frequencies and the sources 31 and 32 locked to theirs, the attenuator 44 is set to maximum attenuation and the receiver 48 is tuned for maximum response at the frequency $f_0$. The differential phase shifter 47 is then adjusted for minimum receiver response. The attenuator 44 and the sliding short-circuit termination 45 are then adjusted to further reduce the response of the receiver 48 to a still lower minimum. The system is now ready for operation with the target 50 in place.

Figure 3:
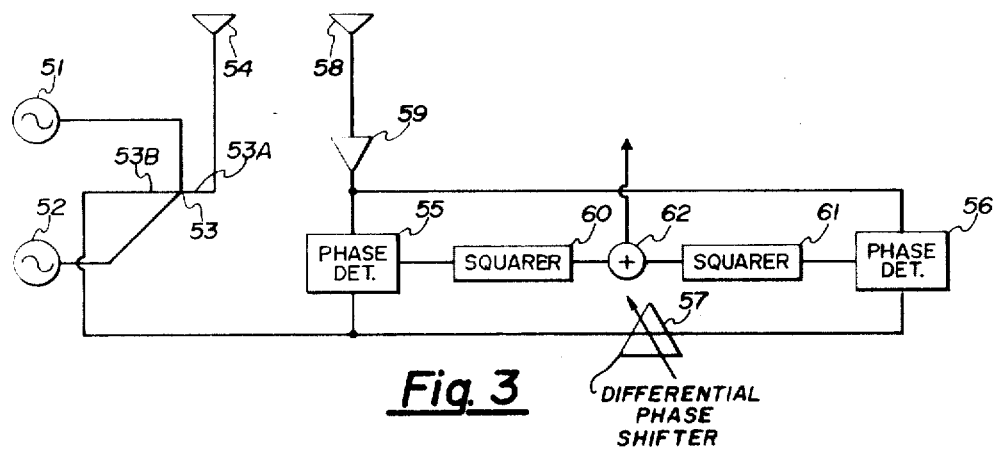
FIG. 3 is a schematic block diagram of another alternative embodiment of the invention.

A schematic block diagram of a third embodiment of the invention is shown in FIG. 3. This embodiment has the advantage of doing without a source at the frequency $f_0$ and a single-sideband modulator. With reference to FIG. 3, unmodulated continuous-wave sources 51 and 52 are operating at frequencies $f - F$ and $f + F$. These sources are combined in the hybrid junction 53 whose outputs are fed from port 53A to a transmitting antenna 54, and from port 53B to phase detector 55, and through a differential phase shifter 57 to phase detector 56. The desired as well as the undesired components of the wave form received by antenna 58 are fed through amplifier 59 to the two phase detectors 55 and 56. The outputs of the two phase detectors 55 and 56 are squared and added in squarers 60 and 61, respectively, and the adder 62.

The arrangement of phase detectors, phase shifter, squarers, and adder is included in this embodiment to keep the output signal from the invention from being sensitive to the phase of the $f$-frequency component of the received wave form. In practice, the phase detectors and the amplifier would probably be operated at a frequency much less than $f$ by means of a heterodyne arrangement. If only one phase detector had been used, the target would have had to be vibrated in range mechanically to provide the required phase shift.

The invention described above is a continuous-wave radar capable of discriminating between desired reflections from a target and undesired direct transmissions and reflections on the basis of range, through the use of two constant radar frequencies. It provides several tens of decibels, more discrimination than conventional continuous-wave radars that use a single constant frequency. It is a relatively simple and uncomplicated scheme for providing such additional discrimination.

Obviously, many modifications and variations of the present invention are possible in the light of the above teachings. It is therefore to be understood that within the scope of the appended claims, the invention may be practiced otherwise than as specifically described.

The invention claimed is:

1. Apparatus for measuring the radar cross-section of a target at a predetermined range comprising:
   a first unmodulated continuous wave signal generating means at a first frequency;
   a second unmodulated continuous wave signal generating means at a second frequency separated from said first frequency by a predetermined amount;
   a mixing means having first and second inputs, said first frequency generating means coupled to said first input and said second frequency generating means coupled to said second input;
   a first output from said mixing means coupled to an antenna in operable proximity to a target to be measured;
   receiving means in operable proximity to said target to be measured;
   a comparison means having a first and second input and an output, said receiving means coupled to said first input and a second output from said mixing means coupled to said comparison means second input; and
   a readout means coupled to an output of said comparison means whereby upon adjusting the phase of said second output from said mixing means undesired signals from said receiving means are reduced at the output of said comparison means.

2. The apparatus of claim 1 wherein:
   said second signal generating means includes mixing means having first and second inputs coupled to said first and second signal generators and an output;
   a phase detector having first and second inputs and an output, said first input coupled to said mixer output;
   a third signal generator tuned to the difference frequency of the first and second signal generators coupled to said second input of said phase detector; and
   said output of said phase detector coupled for frequency control to said second signal generating means.

3. The apparatus of claim 2 and further including:

a single-sideband modulator having first and second inputs and an output, said second output from said mixing means coupled to first input of said single-sideband modulator;

a fourth signal generator tuned to a fourth frequency coupled to a second input of said single-sideband modulator, said output of said single-sideband modulator coupled to said second input of said comparison means.

4. The apparatus of claim 1 wherein said comparison means comprises:

first and second phase detectors, each having a first and second input and an output;

said comparison means first input consisting of said first and second phase detector's first inputs coupled together and said comparison means second input consisting of said first and second phase detector's second input coupled together and said comparison means output consisting of said first and second phase detector's outputs;

first and second squaring means coupled to said first and second phase detector outputs; and combining means combining the outputs of said first and second squaring means.

* * * * *